United States Patent [19]
Sheem

[11] 4,217,032
[45] Aug. 12, 1980

[54] END-BUTT OPTICAL FIBER COUPLER

[76] Inventor: Sang K. Sheem, 7917 Spotswood Dr., Alexandria, Va. 22308

[21] Appl. No.: 962,854

[22] Filed: Nov. 22, 1978

[51] Int. Cl.$^2$ .............................................. G02B 5/14
[52] U.S. Cl. .................................................. 350/96.21
[58] Field of Search ............... 350/96.21, 96.22, 96.20, 350/96.15

[56] References Cited

U.S. PATENT DOCUMENTS

| | | | |
|---|---|---|---|
| 3,800,388 | 4/1974 | Börner et al. | 350/96.21 |
| 3,902,784 | 9/1975 | Dakss | 350/96.21 |
| 3,936,143 | 2/1976 | Sato | 350/96.21 |
| 3,954,338 | 5/1976 | Hennel et al. | 350/96.21 |
| 4,019,806 | 4/1977 | Fellows et al. | 350/96.21 |
| 4,046,454 | 9/1977 | Pugh | 350/96.21 |
| 4,062,620 | 12/1977 | Pirolli | 350/96.21 |

*Primary Examiner*—Rolf G. Hille
*Attorney, Agent, or Firm*—R. S. Sciascia; Philip Schneider

[57] ABSTRACT

An optical waveguide coupler having intersecting deep and shallow grooves in a planar solid substrate, in which the deep groove accommodates an alignment fiber for fine vertical alignment of an optical fiber with another optical fiber or with an optical component such as a switch, modulator, multiplexer or source of light. The shallow groove accommodates the optical fiber. The alignment fiber may be tapered or have any configuration such that its manipulation causes the alignment fiber to contact the underside of the optical fiber for raising or lowering the optical fiber. There may be a plurality of shallow and deep grooves for coupling more than one optical fiber.

7 Claims, 4 Drawing Figures

END-BUTT OPTICAL FIBER COUPLER

BACKGROUND OF THE INVENTION

This invention relates generally to couplers for optical fibers and more particularly to couplers for precisely aligning optical fibers in the vertical direction with other single-mode or multimode optical fibers or with optical components.

Optical communication has been seriously pursued especially since light-transmitting dielectric fibers or optical fibers were drastically improved in terms of propagation loss and mechanical strength. Optical fibers are usually made of various dielectric materials, such as silica or quartz, and have core diameters which range in size from a few microns to hundreds of microns.

One of the most important problems in optical communications is the connection or coupling between fibers, and also between fibers and various optical components. The coupling of the latter combinations is especially difficult due to geometric mismatch between fibers and other optical components. Coupling is more difficult in a single-mode fiber system than in a multi-mode fiber system because of the smaller core dimensions of single-mode fibers. For example, in the coupling between a single-mode fiber and a channel-waveguide, a mismatch of one micron may reduce coupling efficiency by as much as 50 percent. Conventional techniques for precise optical coupling are expensive; have one or more grooves in only one direction and include cumbersome means, such as a plurality of screws, for aligning optical fibers so that coupling to within micron tolerances is impractical; and in some devices, only one fiber may be aligned at a time.

SUMMARY OF THE INVENTION

It is the general purpose and object of the present invention to precisely couple optical fibers with other optical fibers or with other optical components. This and other objects of the present invention are accomplished by a two-dimensional, intersecting groove pattern excised (whenever used herein, this term will be understood as including processes such as preferential etching) from the surface of a substrate wherein a groove in one direction is deeper than an intersecting groove, and an alignment fiber rests in the deep groove. The shallow groove accommodates an optical fiber. The deep groove accommodates the alignment fiber so that the alignment fiber can contact the underside of the optical fiber. The alignment fiber may be tapered or have an eccentric cross-section so that sliding or rotating it, respectively, precisely raises or lowers the optical fiber to a desired level. Alternatively, a multiplicity of deep grooves having slightly different depths may accommodate alignment fibers of uniform diameter so that successively removing an appropriate number of alignment fibers from beneath an optical fiber aligns the optical fiber.

The present invention provides such advantages as very fine alignment of optical fibers, both single-mode and multimode, to within a tolerance of less than one micron, convenience of operation, inexpensive construction, and simultaneous alignments of a plurality of optical fibers.

Other objects and advantages of the invention will become apparent from the following detailed description of the invention when considered in conjunction with the accompanying drawing wherein:

DETAILED DESCRIPTION OF THE INVENTION

Figure 1:
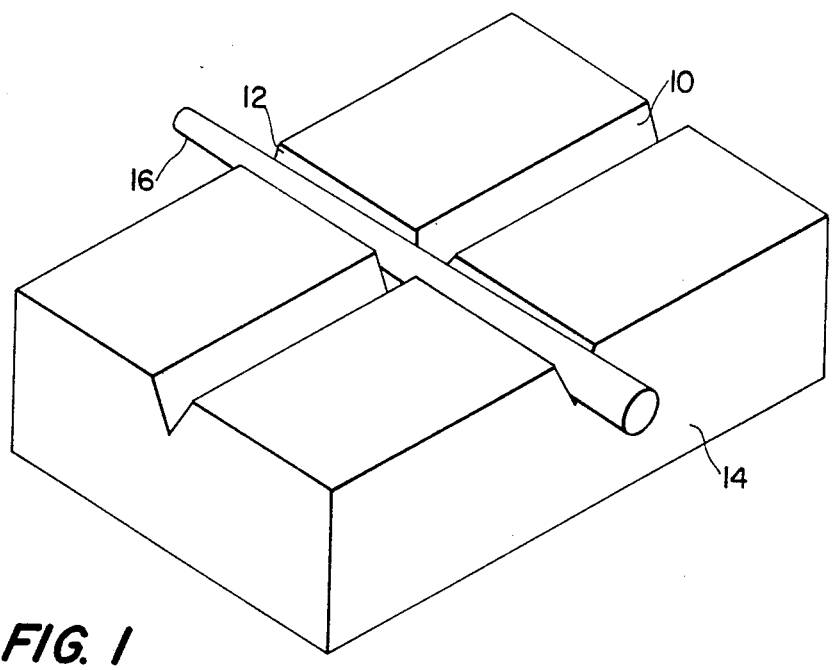
FIG. 1 is an isometric view of a two-dimensional groove pattern having an alignment fiber in the deep groove.

Referring now to the drawings, wherein like reference characters designate like or corresponding parts throughout the several views, FIG. 1 illustrates an embodiment of the present invention wherein a groove pattern, including a shallow groove 10 and an intersecting deep groove 12, is excised from the surface of a planar solid substrate material 14, such as silicon or gallium arsenide, and the deep groove accommodates an alignment fiber 16 preferably made from a dielectric material such as fused silica. It is preferable that the grooves 10 and 12 be V-shaped, as is the case when a crystal such as silicon or GaAs is preferentially etched; however, the grooves may be any convenient shape. Although FIG. 1 illustrates the grooves in approximately two orthogonal directions, the present invention is not limited to this particular groove pattern: that is, the angle between two intersecting directions may be other than 90°; the grooves may be excised in more than two intersecting directions; and the number of shallow and deep grooves may vary to suit a particular application.

Figure 2:
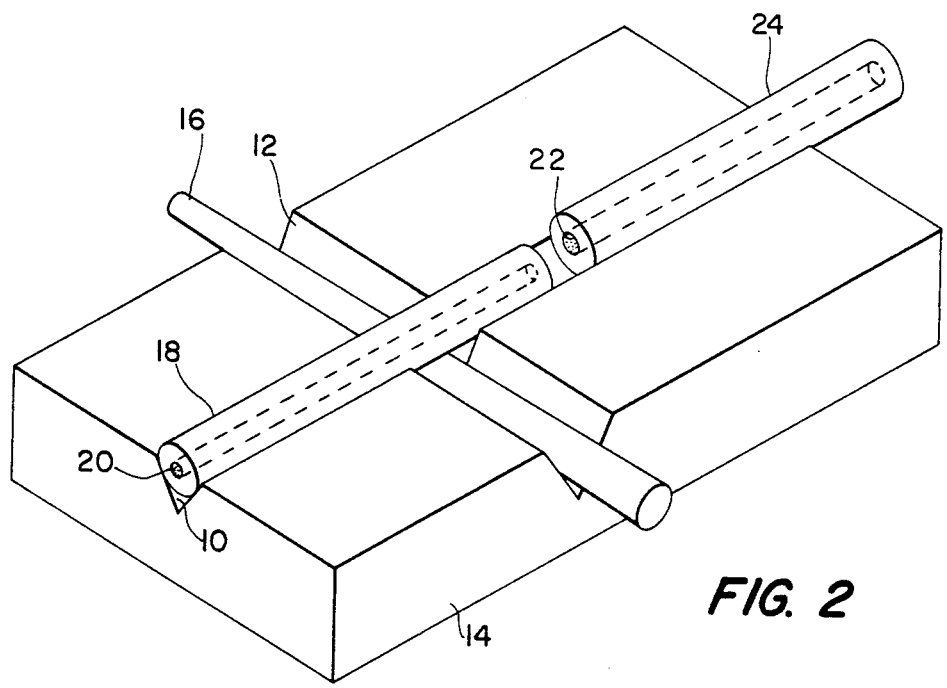
FIGS. 2 and 3 illustrate an optical fiber positioned in the shallow groove of the pattern shown in FIG. 1.

As shown in FIG. 2, an optical fiber 18 rests in the shallow groove 10. The depth and width of the deep groove 12 are such that the alignment fiber 16 lies beneath the optical fiber 18 and can contact the underside of the optical fiber.

Figure 3:
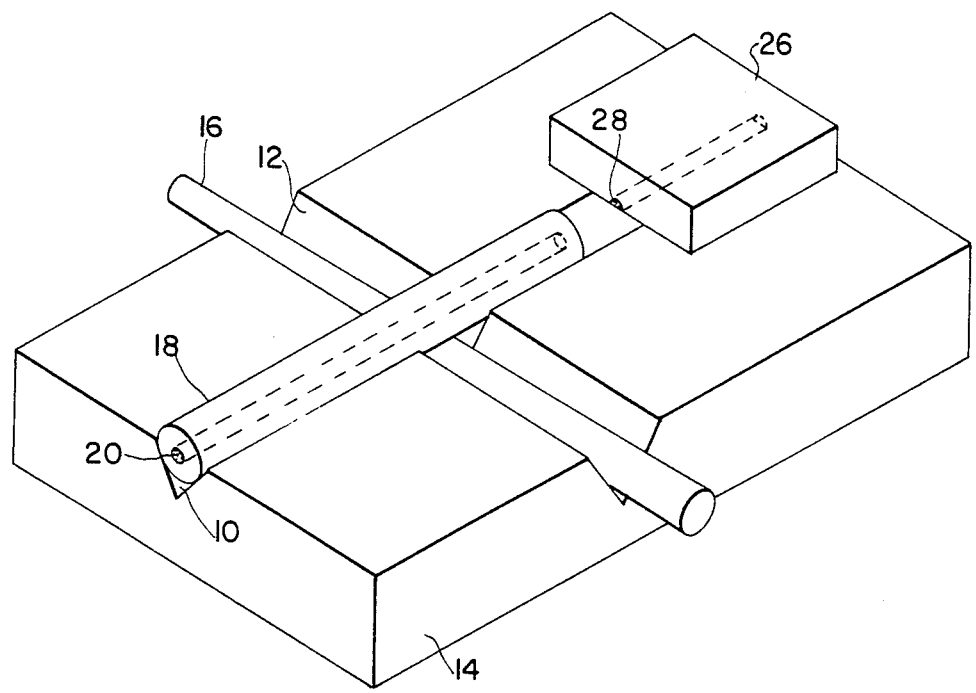

The alignment fiber 16 may be of any configuration, the manipulation of which precisely raises or lowers the optical fiber to a desired level. For example, the alignment fiber 16 may have a circular cross-section that tapers along the longitudinal axis of the alignment fiber at a convenient rate of one micron per suitable length, as for example, one or two centimeters. Thus, sliding the alignment fiber 16 a distance of one or two centimeters or any suitable length raises or lowers the optical fiber 18 by an amount of one micron or a fraction or multiple thereof for precisely aligning the core 20 with the core 22 of another optical fiber 24. For aligning the optical fiber 18 with an optical component 26 having a channel waveguide 28, it is preferable to flip the component 180° so that the channel waveguide is located just above the upper horizontal surface of the substrate 14, as shown in FIG. 3. In this case the base of the core 20 of the optical fiber 18 should be even with or just below the upper horizontal surface of the substrate 14 so that the optical fiber may be raised for precisely aligning the core with the channel waveguide 28.

Alternatively, the alignment fiber 16 may have an eccentric cross-section with or without a taper so that rotating and/or sliding the fiber in its groove 12 for a given distance raises or lowers the optical fiber 18 by a desired amount.

The alignment fiber 16 must not necessarily have a round cross-section but may, for example, be in the shape of a shim.

Figure 4:
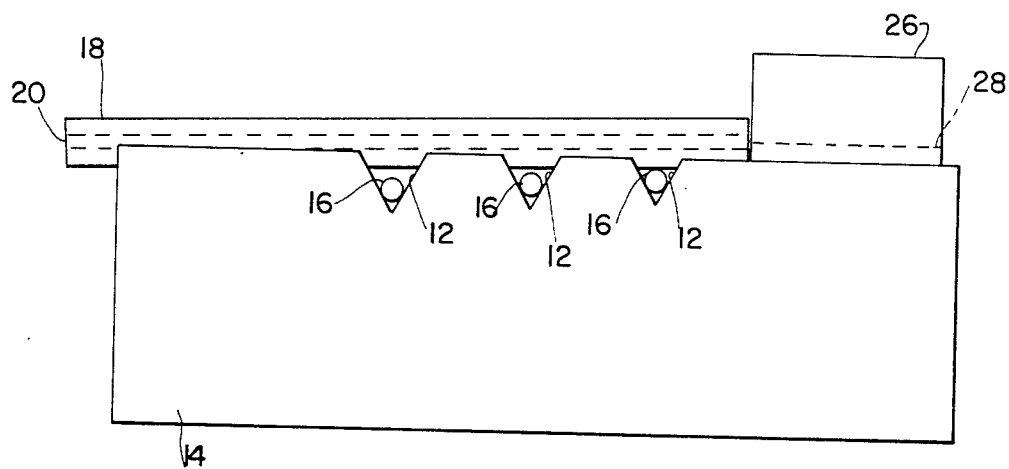
FIG. 4 is a side view of a groove pattern having a multiplicity of deep grooves of slightly varying depths.

FIG. 4 shows another embodiment of the present invention having a multiplicity of deep grooves 12 of varying depths. Each deep groove 12 accomodates an alignment fiber 16 of uniform diameter. A shallow groove (not shown) supports an optical fiber 18 above the alignment fibers 16. Removal of the alignment fibers 16 beginning from the groove 12 of least depth lowers the optical fiber 18 to a suitable level for proper alignment of the core 20 with the core of another optical fiber or with an optical component, as for example, a channel waveguide 28 shown in FIG. 4.

The shallow groove 10 in each embodiment of the present invention is mainly for the lateral alignment of the optical fiber 18. The possibility of slippage by the optical fiber 18 along the lateral direction as the optical fiber is vertically adjusted by the alignment fiber 16 is minimal, because the friction between the optical and alignment fibers is negligible, since the fibers have essentially a point contact, and also because the optical fiber tends to straighten up by itself. In order to completely eliminate any possibility of lateral displacement, another grooved substrate (not shown) may be placed on top of the optical fiber 18 for pressing the optical fiber into place.

Obviously many more modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An end-butt optical coupler for precisely coupling a first optical fiber having an optical core therein to a second optical fiber or an optical component having a channel waveguide comprising:

a first groove and a second groove excised from the surface of a substrate wherein said first groove intersects said second groove, said first groove being deeper than said second groove, and said second groove accommodating said first optical fiber; and an alignment fiber positioned in said first groove so that said alignment fiber is movable in said first groove, contacts the underside of said first optical fiber and vertically adjusts the first optical fiber for aligning the core of the first optical fiber with said second optical fiber or said optical component.

2. A coupler as in claim 1, wherein said first and second grooves are V-shaped grooves.

3. A coupler as in claim 1, wherein said alignment fiber has a circular cross-section and is tapered so that sliding the alignment fiber in said first groove vertically adjusts said first optical fiber.

4. A coupler as in claim 1, wherein said alignment fiber has an eccentric cross-section so that rotating said alignment fiber vertically adjusts said first optical fiber.

5. A coupler as in claim 1, wherein the base of said core of said first optical fiber is even with or just below the upper horizontal surface of said substrate for raising said core and precisely aligning said core with the channel waveguide of said optical component.

6. A coupler as in claim 1, wherein said substrate includes a plurality of said first and second grooves.

7. A coupler as in claim 6, wherein said first grooves are of varying depths so that successively removing said alignment fibers from beneath said first optical fiber lowers said first optical fiber.

* * * * *